United States Patent
Caldwell

(10) Patent No.: US 7,533,923 B1
(45) Date of Patent: May 19, 2009

(54) TAILGATE RAMP SYSTEM

(76) Inventor: Christopher A. Caldwell, 1559 Guenevere St., Streetsboro, OH (US) 44241

(*) Notice: Subject to any disclaimer, the term of this patent is extended or adjusted under 35 U.S.C. 154(b) by 0 days.

(21) Appl. No.: 11/870,712

(22) Filed: Oct. 11, 2007

(51) Int. Cl.
*B62D 25/00* (2006.01)

(52) U.S. Cl. ........................................... 296/61

(58) Field of Classification Search ............... 296/61, 296/39.1, 39.2, 51, 62
See application file for complete search history.

(56) References Cited

U.S. PATENT DOCUMENTS

| | | | | |
|---|---|---|---|---|
| 3,510,015 | A | * | 5/1970 | Roshaven ................ 296/61 |
| 3,711,882 | A | * | 1/1973 | Iller ........................ 14/69.5 |
| 3,870,170 | A | | 3/1975 | Noble et al. |
| 3,977,545 | A | * | 8/1976 | Lloyd ...................... 296/61 |
| 4,242,032 | A | * | 12/1980 | Whiteman et al. ........ 14/71.1 |
| 4,990,049 | A | | 2/1991 | Hargrove |
| 5,022,697 | A | * | 6/1991 | Hettwer ................... 296/37.6 |
| 5,207,472 | A | * | 5/1993 | Gower ..................... 296/39.2 |
| 5,312,149 | A | | 5/1994 | Boone |
| D360,729 | S | | 7/1995 | Collins |
| 5,468,114 | A | | 11/1995 | Hickerson |
| 5,938,397 | A | * | 8/1999 | Schouest ................. 414/537 |
| 5,971,465 | A | * | 10/1999 | Ives et al. ................ 296/61 |
| 5,993,135 | A | * | 11/1999 | Wolgamood .............. 296/61 |
| 6,575,516 | B2 | * | 6/2003 | Webber ................... 296/61 |
| 6,749,246 | B2 | | 6/2004 | Landwehr |
| 7,128,357 | B1 | | 10/2006 | Carroll |
| 7,344,184 | B2 | * | 3/2008 | Salvador et al. ........... 296/61 |
| 7,347,474 | B2 | * | 3/2008 | Shagbazyan .............. 296/61 |
| 2004/0160079 | A1 | | 8/2004 | Harper et al. |
| 2006/0177294 | A1 | | 8/2006 | Garbes |
| 2007/0237614 | A1 | * | 10/2007 | Johnson .................. 414/467 |

* cited by examiner

*Primary Examiner*—Kiran B. Patel

(57) ABSTRACT

A tailgate ramp system includes a truck bed having a bottom wall, a front wall, a first lateral wall and second lateral wall. A tailgate is hingedly coupled to the rear edge of the bottom wall. A liner is positioned in and covers an inner surface of the truck bed. The liner includes a base wall that is positioned on the bottom wall. The base wall has a back edge that is aligned with the rear edge and which has a pair of elongated wells extending therein. A pair of ramps is provided. Each of the ramps has a first end and a second end. Each of the ramps is removably positioned in one of the wells to define a stored position. The first ends are attached in the tailgate and the second ends abut a ground surface to define a deployed position.

11 Claims, 3 Drawing Sheets

TAILGATE RAMP SYSTEM

BACKGROUND OF THE INVENTION

Field of the Invention

The present invention relates to tailgate ramp devices and more particularly pertains to a new tailgate ramp device for providing ramps, as needed, into and out of a pickup truck trailer bed.

SUMMARY OF THE INVENTION

The present invention meets the needs presented above by generally comprising a truck bed having a bottom wall, a front wall, a first lateral wall and second lateral wall. Each of the bottom, first and second lateral walls each has a rear edge defining an opening into the truck bed. A tailgate is hingedly coupled to the rear edge of the bottom wall. The tailgate is vertically oriented to define a closed position or horizontally oriented to define an open position. The tailgate has an upper surface when the tailgate is in the open position. A liner is positioned in and covers an inner surface of the truck bed. The liner includes a base wall, a first side wall, a second side wall and a forward wall. The base wall is positioned on the bottom wall. The base wall has a back edge that is aligned with the rear edge. The back edge has a pair of elongated wells extending therein and is positioned between a top side and a bottom side of the base wall. A pair of ramps is provided. Each of the ramps has a first end and a second end. Each of the ramps is removably positioned in one of the wells to define a stored position. The first ends are attached to the tailgate and the second ends abut a ground surface to define a deployed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
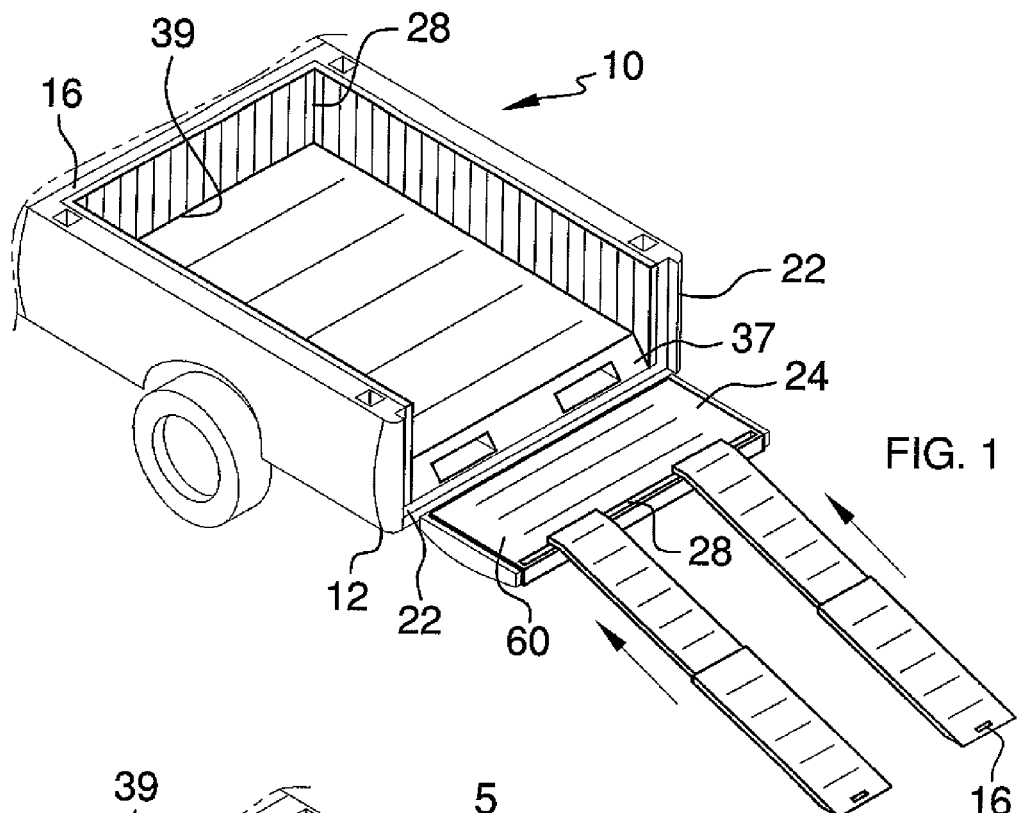
FIG. 1 is a perspective view of a tailgate ramp system according to the present invention.

With reference now to the drawings, and in particular to FIGS. 1 through 5 thereof, a new tailgate ramp device embodying the principles and concepts of the present invention and generally designated by the reference numeral 10 will be described.

As best illustrated in FIGS. 1 through 5, the tailgate ramp system 10 generally comprises a truck bed 12 that has a bottom wall 14, a front wall 16, a first lateral wall 18 and a second lateral wall 20. Each of the bottom 14, first 18 and second 20 lateral walls each has a rear edge 22 defining an opening into the truck bed 12. The truck bed 12 is of the type conventionally found on a pickup truck bed.

A tailgate 24 is hingedly coupled to the rear edge 22 of the bottom wall 14. The tailgate 24 is vertically oriented to define a closed position or horizontally oriented to define an open position. The tailgate 24 has an upper surface 26.

A liner 28 is positioned in and covers an inner surface of the truck bed 12. The liner 28 includes a base wall 30, a first side wall 32, a second side wall 34 and a forward wall 36. The base wall 30 is positioned on the bottom wall 14. The base wall 30 has a back edge 37 that is aligned with the rear edge 22 of the bottom wall 14. The back edge 37 has a pair of elongated wells 38 extending therein. The walls are positioned between a top side 40 and a bottom side 42 of the base wall 30. The wells 38 may extend from the back edge 37 to the forward wall 36. The back edge 37 may be angled toward a front edge 39 of the liner from the bottom side 42 to the top side 40 to form a smoother transition from the top side 40 to the tailgate 24.

Figure 4:
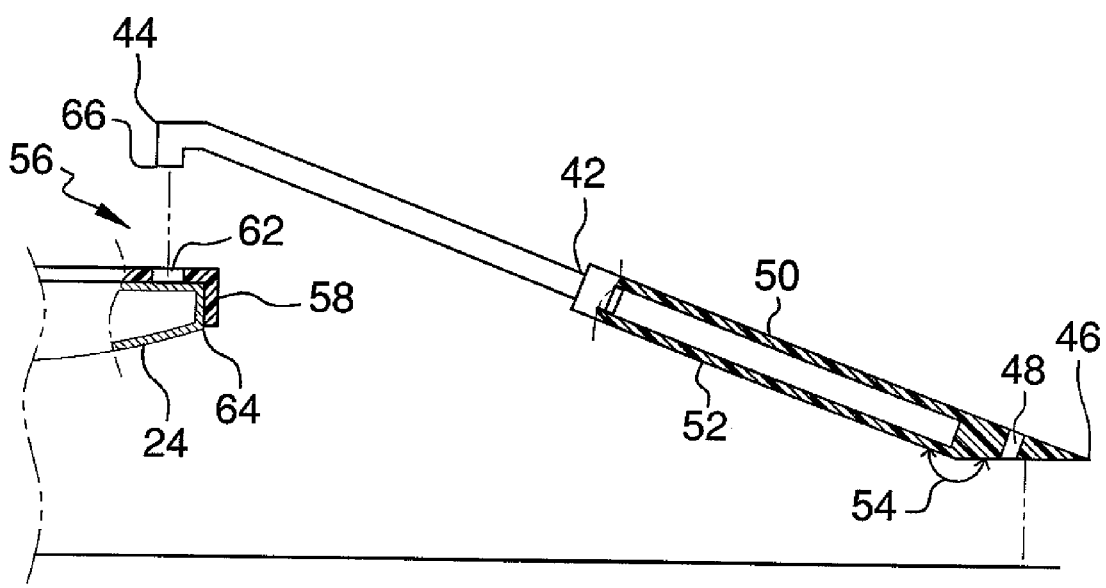
FIG. 4 is a side broken view of the present invention.
Figure 5:
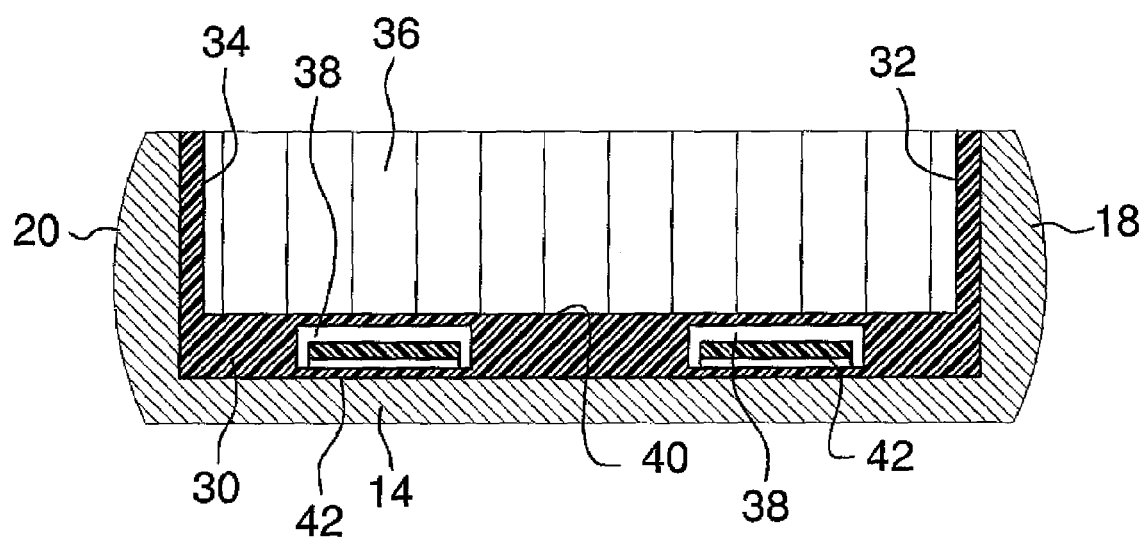
FIG. 5 is a cross-sectional view taken along line 5-5 of FIG. 2 of the present invention.

A pair of ramps 42 is provided. Each of the ramps 42 has a first end 44 and a second end 46. Each of the ramps 42 is removably positioned in one of the wells 38 to define a stored position. The first ends 44 are attached to the tailgate 24 and the second ends 46 abut a ground surface to define a deployed position. The ramps 42 are telescopic and have a selectable length from the first ends 44 to corresponding ones of the send ends 46. Each of the ramps 42 has a gripping aperture 48 extending therethrough. The griping apertures 48 are positioned adjacent to a respective one of the second ends 46 of the ramps 42. The ramps 42 have an upper side 50 and a lower side 52. The lower sides 52 taper toward the upper sides 50 adjacent to the second ends 46 and form a bend 54 having an angle approximately between 135 degrees and 160 degrees. This allows the lower sides 52 adjacent to the second ends 46 to lie flush with the ground surface when the ramps 42 are angled with respect to the ground surface as shown in FIG. 4.

A coupling assembly 56 removably couples the ramps 42 to the tailgate 24. The coupling assembly 56 includes are receiver 58 mounted on the upper surface 26 of the tailgate 24. The receiver 58 includes a plate 60 positioned on and covering the upper surface 26 of the tailgate 24. An elongated slot 62 is positioned in the plate 60 adjacent to a distal end 64 of the tailgate 24. The coupling assembly 56 further includes a pair of male couplers 66. Each of the first ends 44 of the ramps 42 has one of the male couplers 66 attached thereto. The male couplers 66 are extendable into the slot 62.

Figure 2:
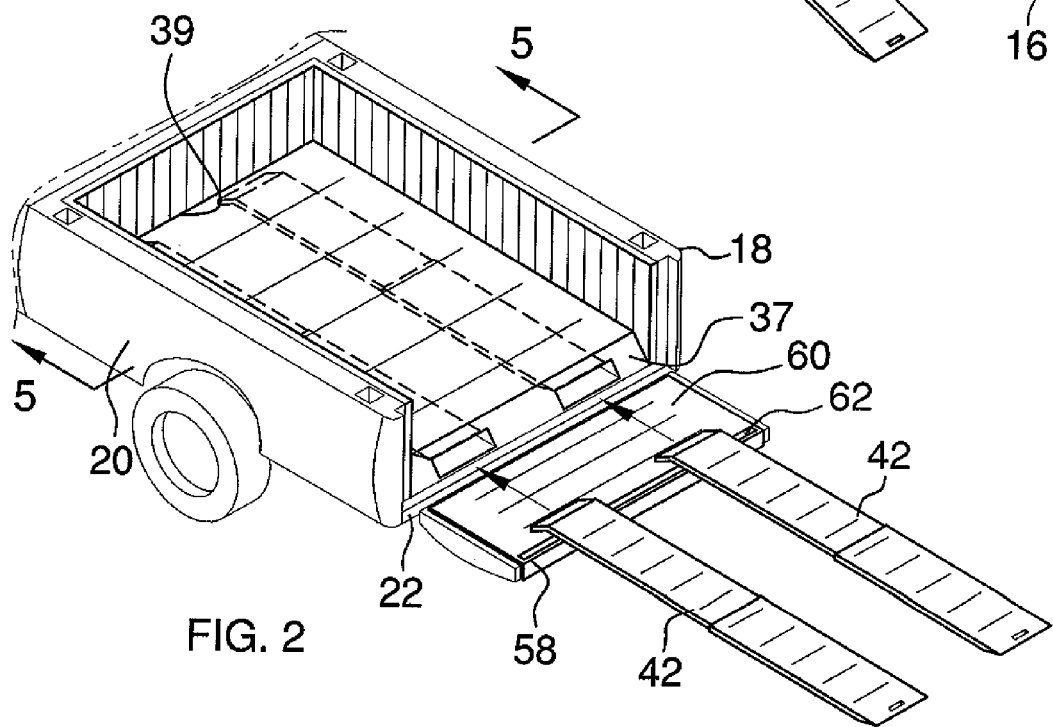
FIG. 2 is a perspective view of the present invention.
Figure 3:
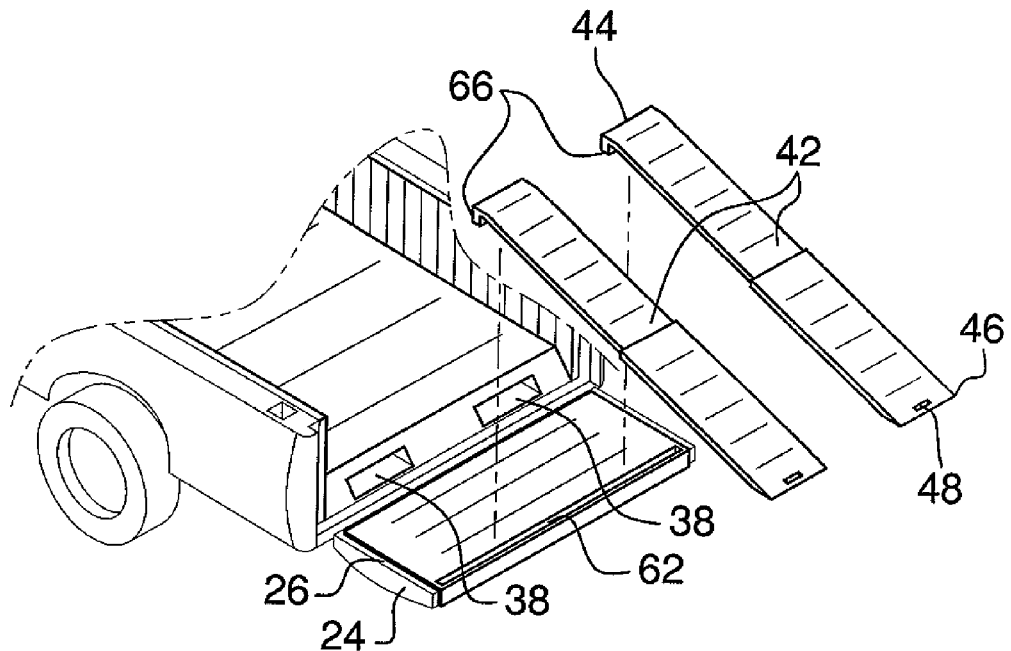
FIG. 3 is a perspective view of the present invention.

In use, the ramps 42 may be used, as needed, for easily rolling or lifting items into the pickup bed 12 by extending ramps 42 out of the liner 28 and mounting them on the tailgate 24 as shown in FIG. 2. When not being used, the ramps 42 are extended back into the wells 38 and the tailgate 24 placed in a closed position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate ramp system comprising:
    a truck bed having a bottom wall, a front wall, a first lateral wall and second lateral wall, each of said bottom, first and second lateral walls each having a rear edge defining an opening into said truck bed;
    a tailgate being hingedly coupled to said rear edge of said bottom wall, said tailgate being vertically oriented to define a closed position or horizontally oriented to define an open position, said tailgate having an upper surface when said tailgate is in said open position;
    a liner being positioned in and covering an inner surface of said truck bed, said liner including a base wall, a first side wall, a second side wall and a forward wall, said base wall being positioned on said bottom wall, said base wall having a back edge being aligned with said rear edge, said back edge having a pair of elongated wells extending therein and being positioned between a top side and a bottom side of said base wall; and
    a pair of ramps, each of said ramps having a first end and a second end, each of said ramps being removably positioned in one of said wells to define a stored position, each of said first ends being attached to said tailgate and said second ends abutting a ground surface to define a deployed position.

2. The system according to claim 1, further including a coupling assembly removably coupling said ramps to said tailgate, said coupling assembly including a receiver mounted on said upper surface of said tailgate, said receiver including an elongated slot therein positioned adjacent to a distal end of said tailgate with respect to said bottom wall, said coupling assembly further including a pair of male couplers, each of said first ends of said ramps having one of said male couplers attached thereto, each of said male couplers being extendable into said slot.

3. The system according to claim 1, wherein each of said ramps is telescopic and has a selectable length from said first ends to a corresponding one of said second ends.

4. The system according to claim 1, wherein each of said ramps having a gripping aperture extending therethrough.

5. The system according to claim 4, wherein said gripping apertures are positioned adjacent to a respective one of said second ends of said ramps.

6. The system according to claim 3, wherein each of said ramps has an upper side and a lower side, said lower sides tapering toward said upper sides adjacent to said second ends and forming a bend having an angle approximately between 135 degrees and 160 degrees.

7. The system according to claim 1, wherein each of said ramps has an upper side and a lower side, said lower sides tapering toward said upper sides adjacent to said second ends and forming a bend having an angle approximately between 135 degrees and 160 degrees.

8. The system according to claim 2, wherein each of said ramps is telescopic and has a selectable length from said first ends to a corresponding one of said second ends.

9. The system according to claim 8 wherein each of said ramps having a gripping aperture extending therethrough.

10. The system according to claim 9 wherein said gripping apertures are positioned adjacent to a respective one of said second ends of said ramps.

11. The system according to claim 10, wherein each of said ramps has an upper side and a lower side, said lower sides tapering toward said upper sides adjacent to said second ends and forming a bend having an angle approximately between 135 degrees and 160 degrees.

\* \* \* \* \*